United States Patent [19]

Keskey et al.

[11] Patent Number: 4,508,869

[45] Date of Patent: Apr. 2, 1985

[54] LATEXES OF POLYMERS HAVING PENDANT COREACTIVE AND OXAZOLINE GROUPS

[75] Inventors: William H. Keskey; James E. Schuetz; Do I. Lee, all of Midland, Mich.

[73] Assignee: The Dow Chemical Company, Midland, Mich.

[21] Appl. No.: 504,120

[22] Filed: Jun. 14, 1983

[51] Int. Cl.³ ............................................ C08L 39/00
[52] U.S. Cl. ................................... 524/808; 525/279; 526/260
[58] Field of Search ......................... 524/808; 526/260

[56] References Cited

U.S. PATENT DOCUMENTS 4,325,856  4/1982  Ishikawa et al. .................... 524/808

Primary Examiner—Joseph L. Shofer
Assistant Examiner—J. M. Reddick

[57] ABSTRACT

Latexes containing particles having pendant coreactive groups and oxazoline groups are disclosed. Said latexes are self-curing yielding films and other articles having excellent tensile strength and resistance to water and other solvents. In addition, a process for making such latexes is disclosed.

13 Claims, No Drawings

LATEXES OF POLYMERS HAVING PENDANT COREACTIVE AND OXAZOLINE GROUPS

BACKGROUND OF THE INVENTION

This invention relates to curing polymeric latexes, more specifically to self-curing polymer latexes.

Diverse self-curing polymer latexes are known in the art. For example, blends of a carboxylated latex such as an acrylic acid/styrene/butadiene terpolymer latex with a melamine formaldehyde or urea formalde resin are known to be self-curing, i.e., they form a curing composition which cures at elevated temperatures.

Other self-curable latex systems employ a carboxylated latex which is crosslinked with a polyvalent cation or with a cationic polymer. Such latexes have the disadvantages of being pH dependent and of forming films which are highly sensitive to water and other aqueous fluids.

It is known that acid and oxazoline groups will react under certain conditions to form an amide ester. Unfortunately, however, latex particles containing both oxazoline and acid groups have not heretofore been prepared.

Accordingly, it would be desirable to provide a polymer latex which is self-curing without the formation of by-products and which, upon curing, forms films or adhesives having excellent physical properties and improved resistance to water and organic solvents.

It would also be desirable to provide a process by which polymers or polymer latexes containing both pendant acid and pendant oxazoline groups are prepared.

SUMMARY OF THE INVENTION

The present invention is such a polymer and process. In one aspect, the present invention is a thermosettable latex composition comprising discrete polymer particles, which particles have been prepared by the polymerization of addition polymerizable monomers, which monomers comprise (a) a coreactive monomer containing pendant groups which are capable of reacting with oxazoline groups to form a covalent bond thereto, (b) an oxazoline as represented by the general structure:

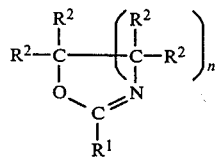

wherein $R^1$ is an acyclic organic radical having addition polymerizable unsaturation, each $R^2$ is independently hydrogen, halogen or an inertly substituted organic radical and n is 1 or 2 and (c) at least one other addition polymerizable monomer which does not contain a coreactive or oxazoline group.

In another aspect, this invention is a process for preparing a latex comprising diserete particles containing pendant acid and oxazoline groups, said process comprising the steps of (a) forming a latex containing particles of a polymer containing pendant acid groups by polymerizing the first monomer mix comprising an addition polymerizable monomer containing an acidic group and at least one other addition polymerizable monomer which is copolymerizable with said monomer, said polymerization being conducted at a pH sufficiently low that the monomer containing the acidic group substantially copolymerizes with said other monomer, then (b) adjusting the pH of the resulting latex to a value at which an addition polymerizable oxazoline is not significantly reactive or hydrolyzed under conditions suitable for the polymerization thereof, (c) adding to said latex a second monomer mix comprising (1) an addition polymerizable oxazoline as represented by the general structure:

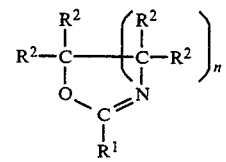

wherein $R^1$, $R^2$ and n are as defined hereinbefore and (2) at least one other monomer which does not contain pendant acid or oxazoline groups, and (d) polymerizing said monomer mix under conditions such that the second monomer mix is polymerized within or around said particles of a polymer containin pendant acid groups.

Surprisingly, the latexes of this invention exhibit, upon drying and curing, excellent tensile strength and elongation, as well as superior resistance to water and solvents. Accordingly, such latexes are useful in a variety of applications including films, coatings, adhesives, binders for nonwoven fabrics and the like.

DETAILED DESCRIPTION OF THE INVENTION

The latexes of this invention are advantageously prepared in a two-stage emulsion polymerization process. In the first stage of polymerization, a first monomer mix comprising an addition polymerizable coreactive monomer and at least one other monomer copolymerizable therewith is polymerized.

Such polymerization is conveniently conducted using substantially conventional emulsion polymerization techniques in aqueous medium with conventional additives. Typically, the aqueous phase will contain from about 0.5 to about 5 weight percent (based on the monomer charge) of conventional nonionic or anionic emulsifiers (e.g., potassium, N-dodecyl sulfonate, sodium isooctobenzene sulfonate, sodium laurate, nonyl phenol ethers of polyethylene glycols and the like).

Conventional emulsion polymerization catalysts can be employed in the foregoing latex polymerization and common examples thereof include peroxides, persulfates, azo compounds and the like such as sodium persulfate, potassium persulfate, ammonium persulfate, hydrogen peroxide, azodiisobutyric diamide as well as catalysts (e.g., redox catalysts) which are activated in the water phase (e.g., by a water-soluble reducing agent). The type and amount of catalyst, as well as the particular polymerization conditions employed, will typically depend on the other monomers which are used and polymerization conditions will be generally selected to favor the polymerization of such other monomers. Typically, such catalysts are employed in a catalytic amount, e.g., ranging from 0.01 to about 5 weight percent based upon the monomer weight. In general, the polymerization is conducted at a temperature in the range of from about $-10°$ to about $110°$ C. (preferably from about 50° to about 90° C.). When the coreactive monomer is one containing pendant weakly acidic groups as described hereinbelow, such as carboxyl groups, the polymerization is advantageously conducted under conditions sufficiently acidic to promote the copolymerization of the weakly acidic coreactive monomers with the other monomers being employed. In such case, the pH is preferably between about 1 and about 6, more preferably between about 1 to about 4. The polymerization may be conducted continuously, semi-continuously or batch-wise.

Similarly, conventional chain transfer agents such as, for example, n-dodecyl mercaptan, bromoform, carbon tetrachloride and the like can also be employed in the normal fashion in the aforementioned first stage polymerization to regulate the molecular weight of the polymer formed therein, and, typically, when such chain transfer agents are used, they are employed in amounts ranging from 0.01 to about 10 (preferably from about 0.1 to about 5) weight percent based upon the weight of the monomers employed in the polymerization. The amount of chain transfer agent employed depends somewhat on the particular transfer agent employed and the particular monomers being polymerized.

Suitable latex polymerization procedures are taught, for instance, in U.S. Pat. Nos. 4,325,856; 4,001,163; 3,513,121; 3,575,913; 3,634,298; 2,399,684; 2,790,735; 2,880,189; and 2,949,386.

The coreactive monomers employed herein are those which contain pendant coreactive groups which are capable of reacting with an oxazoline group to form a covalent bond thereto. It is understood that the reaction of such coreactive groups with the oxazoline group will typically, but not necessarily, cause the oxazoline ring to open.

Typically, the pendant coreactive group on the coreactive monomer will contain a reactive hydrogen atom. Exemplary coreactive groups containing an active hydrogen atom include weak acid groups, aliphatic alcohols; aromatic alcohols, i.e., phenols; amines and amides, i.e., —CONH$_2$ and —CONH— groups. In general, the more reactive of such groups, i.e., those having the more labile hydrogen, such as the acids and aromatic alcohols, are preferred herein. Such more reactive groups will generally react with the oxazoline ring more readily under milder conditions than the less reactive groups such as the amines and aliphatic alcohols. Amide groups are generally intermediate in reactivity.

Especially preferred are monomers containing pendant weak acid groups or acid anhydride groups, especially ethylenically unsaturated monomers containing weak acid or acid anhydride groups. Exemplary of suitable monomers containing carboxylic acid groups include itaconic acid, acrylic acid, methacrylic acid, fumaric acid, maleic acid, vinylbenzoic acid and isopropenylbenzoic acid. The more preferred species include acrylic, methacrylic, fumaric, itaconic and maleic acids. Maleic anhydride is an example of a suitable monomer containing an acid anhydride group.

Suitable coreactive monomers containing phenolic groups include ortho- and meta-vinyl phenol.

Suitable coreactive monomers containing aliphatic hydroxyl groups include, for example, hydroxyethylacerylate, hydroxypropylmethacrylate and N-hydroxyethyl-N-methyl acrylamide. Derivatives of styrene having aliphatic hydroxyl groups are also useful herein.

Suitable coreactive monomers containing amide groups include acrylamide, methacrylamide, vinyl acetamide and α-chloroacrylamide. N-methylacrylamides and N-methylmethacrylamide are examples of monomers containing (CONH) groups.

Suitable coreactive monomers containing amine groups include allyl amine, 2-aminoethylacrylate, 3-aminoethylmethacrylate and the like.

In addition to the coreactive monomer, the first monomer mix also contains at least one other monomer which is not a coreactive monomer and which is copolymerizable with the coreactive monomer. A broad range of addition polymerizable monomers are copolymerizable with said coreactive monomers and are suitable herein.

Suitable monomers include, for example, the monovinyl aromatics, alkenes, esters of α,β-ethylenically unsaturated carboxylic acid; carboxylic acid esters wherein the ester group contains addition polymerizable unsaturation; halogenated alkenes; acyclic aliphatic conjugated dienes and the like.

The term "monovinyl aromatic monomer" is intended to include those monomers wherein a radical of the formula:

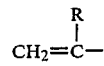

(wherein R is hydrogen or a lower alkyl such as an alkyl having from 1 to 4 carbon atoms) is attached directly to an aromatic nuclear containing from 6 to 10 carbon atoms, including those wherein the aromatic nucleus is substituted with alkyl or halogen substituents. Typical of these monomers are styrene, α-methylstyrene, ortho-, meta- and para-methylstyrene; ortho-, meta- and para-ethylstyrene; o,p-dimethylstyrene; o,p-diethylstyrene; isopropylstyrene; o-methyl-p-isopropylstyrene; p-chlorostyrene; p-bromostyrene; o,p-dichlorostyrene; o,p-dibromostyrene; vinylnaphthalene; diverse vinyl (alkylnaphthalenes) and vinyl (halonaphthalenes) and comonomeric mixtures thereof. Because of considerations such as cost, availability, ease of use, etc., styrene and vinyltoluene are preferred and styrene is especially preferred as the monovinyl aromatic monomer.

Alkenes suitably employed herein include the monounsaturated aliphatic organic compounds such as ethylene, N- and isopropylene, the diverse butenes, pentenes, hexanes and the like as well as alkenes containing diverse substituent groups which are inert to the polymerization thereof. Preferred are unsubstituted $C_2$–$C_8$ alkenes with $C_2$–$C_4$ unsaturated alkenes being most preferred.

Esters of α,β-ethylenically unsaturated carboxylic acids useful herein include typically soft acrylates (i.e., those whose homopolymers have a glass transition temperature ($T_g$) of less than about 25° C.) such as benzyl acrylate, butyl acrylate, sec-butyl acrylate, cyclohexyl acrylate, dodecyl acrylate, ethyl acrylate, 2-ethylbutyl acrylate, 2-ethylhexyl acrylate, heptyl acrylate, hexyl acrylate, isobutyl acrylate, isopropyl acrylate, methyl acrylate, propyl acrylate, etc.; hard acrylates (i.e., those whose homopolymers have a $T_g$ of greater than about 25° C.) such as 4-biphenylyl acrylate and tert-butyl acrylate; soft methacrylates such as butyl methacrylate, and hexyl methacrylate; and hard methacrylates such as sec-butyl methacrylate, tert-butyl methacrylate, cyclohexyl methacrylate, ethyl methacrylate, isobutyl methacrylate, isopropyl methacrylate, methyl methacrylate, propyl methacrylate, etc. The cost, availability and known properties of butyl acrylate and ethyl acrylate make these monomers preferred among the acrylates. The cost, availability and known properties of methyl methacrylate make it preferred among the methacrylates.

Halogenated alkenes useful herein include, for example, vinyl chloride, vinylidene chloride, vinyl fluoride, vinylidene fluoride, the diverse polychloro-, polyfluoro- and polybromo-alkenes and the like.

Acyclic aliphatic conjugated dienes usefully employed herein include typically those compounds which have from about 4 to about 9 carbon atoms, for example, 1,3-butadiene, 2-methyl-1,3-butadiene; 2,3-dimethyl-1,3-butadiene; pentadiene; 2-neopentyl-1,3-butadiene and other hydrocarbon analogs of 2,3-butadienes, such as 2-chloro-1,3-butadiene; 2-cyano-1,3-butadiene, the substituted straight chain conjugated pentadienes, the straight chain and branched chain conjugated hexadienes, other straight and branched chain conjugated dienes having from 4 to about 9 carbon atoms, and comonomeric mixtures thereof. The 1,3-butadiene hydrocarbon monomers such as those mentioned hereinbefore provide interpolymers having particularly desirable properties and are therefore preferred. The cost, ready availability and the excellent properties of interpolymers produced therefrom makes 1,3-butadiene the most preferred acyclic aliphatic conjugated diene.

Mixtures of two or more of the foregoing monomers may, of course, be employed herein, if desired. Of the foregoing monomers, most preferred are styrene, mixtures of styrene and butadiene, butyl acrylate, methyl methacrylate and vinyl acetate.

The proportion of monomers used in the first monomer mix may vary considerably depending upon the particular end-use of the composition. Typically, however, the coreactive monomer is employed in a relatively minor amount, e.g., from about 0.1 to about 20, preferably from about 1 to about 10, weight percent of the monomers. In general, the coreactive monomer is employed primarily to impart the desired self-curing characteristics to latex compositions and the other monomers employed to impart the other desired properties to the composition. For example, in a preferred acid-/oxazoline-modified sytrene/butadiene latex, the oxazoline-modified polymer will advantageously exhibit properties similar to those commonly associated with styrene/butadiene polymers and the acid monomer contributes little except curing characteristics to the polymer. It is noted that weak acid-containing polymers also often exhibit enhanced colloidal stability.

Upon completion of the polymerization of the first monomer mix, the pH of the resulting coreactive latex is adjusted, if necessary, into a range which is sufficiently high that during the subsequent polymerization of the second monomer mix containing oxazoline monomers, the oxazoline ring does not significantly react or hydrolyze. Typically, adjustment of the pH into the range from about 3 to about 11, preferably about 6 to about 11, more preferably from about 7 to about 10, is satisfactory. Any convenient water-soluble alkaline material, e.g., ammonium hydroxide, sodiu hydrogen carbonate or sodium hydroxide, is advantageously employed to raise the pH to the aqueous phase.

To the coreactive latex is added a second monomer mix comprising an oxazoline monomer and at least one other addition polymerizable monomer which is not a coreactive monomer or an oxazoline and which is copolymerizable with the oxazoline monomer. This second monomer mix is added to the coreactive latex under conditions such that the monomers are polymerized within or around the coreactive latex particles. The general polymerization conditions employed are as described hereinbefore except that the pH of the aqueous phase is adjusted, if necessary, into the aformentioned range (i.e., sufficient to prevent substantial reaction or hydrolysis of the oxazoline monomer) during the polymerization reaction.

If necessary or desired, additional amounts of aqueous phase emulsifier, catalyst, initiator and the like may be added to the coreactive latex prior to or simultaneously with the addition of the second monomer mix in order to facilitate the polymerization thereof.

The second stage of the polymerization may be conducted immediately following the preparation of the coreactive latex. Alternatively, the coreactive latex may be prepared beforehand and stored until the second stage polymerization is conducted.

The oxazolines employed herein are as represented by the general structure:

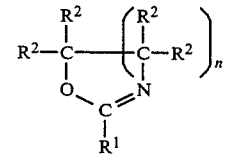

wherein $R^1$ is an acyclic organic radical having addition polymerizable unsaturation; each $R^1$ is independently hydrogen, halogen or an organic radical and n is 3. Preferably, $R^1$ is

wherein $R^3$ is hydrogen or an alkyl radical. Most preferably, $R^1$ is an isopropenyl group. Each $R^2$ is preferably hydrogen or alkyl group with hydrogen being most preferred; n is preferably 1. Most preferably, the oxazoline is 2-isopropenyl-2-oxazoline.

The other monomers employed in this second monomer mix is any addition polymerizable monomer which is not a coreactive monomer or an oxazoline and which is copolymerizable with said oxazoline. In general, those monomers described hereinbefore as useful in the first monomer mix are also usefully employed in the second monomer mix. It is often desirable to "match" the monomers employed in the first monomer mix with those in the second monomer mix, i.e., to employ the same or substantially similar monomers in the same or substantially similar proportions in both the first and second monomer mixes. For example, if styrene, butadiene and acrylic acid are employed in the first monomer mix, a second monomer mix containing styrene, butadiene and oxazoline monomer can be employed to match said first and second monomer mix. Of course, it is not necessary or always desirable to match the backbone of the first and second monomer mixes in the practice of this invention. More generally, the choice of other monomers in both the first and second monomer mixes is such that the resulting latex has the desired physical and chemical properties.

The proportions of monomers used in the second monomer mix may vary considerably depending on the particular end-use of the composition. Typically, however, oxazoline is employed in a relatively minor amount, e.g., from about 0.1 to about 20, and preferably from about 1 to about 10, weight percent of the monomers. In general, the oxazoline monomer is employed primarily to impart the self-curing characteristics to the latex and the other monomers are employed to impart the other desired properties to the latex.

Advantageously, the second monomer mix contains from about 0.05 to about 20, preferably from about 0.2 to about 5, more preferably from about 0.5 to about 2, mole of oxazoline monomer per mole of coreactive monomer employed in the first monomer mix. Most preferably, the amount of oxazoline monomer employed is substantially equivalent on a molar basis to the amount of acid monomer employed.

Following the polymerization of the second monomer mix, there is obtained a curable latex composition. Such composition comprises discrete polymer particles which polymer particles have been prepared by the addition polymerization of monomers comprising (a) a coreactive monomer, (b) an oxazoline monomer as described hereinbefore and (c) at least one other addition polymerizable monomer. When the other monomer in the first monomer mix is different from the other monomers employed in the second monomer mix, the resulting latex particles will have been prepared from, in addition to the oxazoline monomers, at least two other addition polymerizable monomers. While not intending to be bound by theory, it is believed that the polymer particles in the latex of this invention are structured latexes in which the polymers prepared in the second monomer mix either encapsulate or interpenetrate the polymers prepared from the first monomer mix. However, it is recognized that during the polymerization of said second monomer mix, certain amounts of graft or block copolymers may be formed. The precise polymeric structure of the polymer particles is not considered critical to this invention. Essential features of the polymer particles are that such particles contain both pendant coreactive groups and pendant oxazoline groups.

Advantageously, the polymer particles have a particle size distribution such that, upon film formation, the particles can become relatively closely packed together to form coherent films.

The curing latex composition of this invention may be used for a variety of applications including paper coating compositions, adhesives, binders and fibrous, nonwoven fabric compositions and the like. Such compositions are especially suitable for those applications in which a self-curable, curing polymer composition is desired.

The latexes of this invention may be employed as adhesives, films or binders by applying the latex to the desired substrate and then dewatering the latex in curing the dewatered polymers. The dewatering step may be performed by merely allowing the aqueous phase to evaporate under ambient conditions. Alternatively, elevated (i.e., 50°–165° C.) temperatures may be employed to dewater the latex. Curing of the polymer may, likewise, be performed at ambient temperatures. Such ambient temperature curing is an unexpected property of the latexes of this invention. Such room temperature curing is generally conducted over a period of several hours to several days depending on the particular polymers employed, the amounts of oxazoline and coreactive groups in the polymer, the thickness of the film adhesive or binder layers, the amount of crosslinking desired and like factors. Curing may also be effected by heating the polymers to about 100° to about 165° C., preferably 120° to 150° C. for short periods. The foregoing drying and curing points may not be distinct steps but may be carried out simultaneously if desired.

The following examples are intended to illustrate the invention but not to limit the scope thereof. All parts and percentages are by weight unless otherwise indicated.

EXAMPLE 1

Into a 1-gallon, jacketed reactor equipped with lab pumps to deliver monomer and aqueous feeds are added 593 g of deionized water, 7 g of a 1 percent active aqueous pentasodium diethylene triamine pentacetate solution and 21.9 g of a 32 percent solids seed latex containing polystyrene particles having a volume average particle size of about 263 Å.

The reactor is purged with nitrogen and heated to 90° C. Then, over a 3-hour period, is added a monomer stream containing 455 g of butyl acrylate, 217 g of styrene, 28 g of acrylic acid and 3.8 g of 55 percent active divinylbenzene. Beginning simultaneously with the start of the monomer stream is added continuously over a 4-hour period 245 g of deionized water, 15.56 g of a 45 percent active aqueous surfactant solution, 14 g of a 10 percent aqueous sodium hydroxide solution and 4.9 g of sodium persulfate. Following addition of the monomer and aqueous streams, the reaction mixture is heated at 90° C. for 1 additional hour and then cooled. The product is a 45 percent solids latex of a butyl acrylate/styrene/acrylic acid/divinylbenzene polymer in a 65:31:4:0.3 percent weight ratio.

A 1244.0 g portion of the resulting coreactive latex is then placed into a 1-gallon stainless steel reactor together with 100 g of water and sufficient ammonium hydroxide to increase the pH from 3.9 to 8.7. The reactor is then purged with nitrogen and the monomer mix comprising 14 g of 2-isopropenyl-2-oxazoline, 91 g of butyl acrylate and 35 g of styrene are added. Also added are 171 g of deionized water and 0.7 g of sodium persulfate. The resulting mixture is then polymerized at 60° C. for 8 hours and cooled. The resultant latex contains polymer particles having both pendant acid and pendant oxazoline groups, as confirmed by infrared spectroscopy.

The resultant latex is thickened with a small amount of sodium polyacrylate and 20-mil thick films of the latex are cast onto a Teflon brand coated steel plate using a film bar of 20-mil thickness. The films are then dried at ambient temperature until they are transparent and then they are peeled from the plate and further dried at ambient temperature for about 24 hours. The air-dried films are then cured for 5 minutes in an oven set at diverse curing temperatures as noted in Table I following. The cured films are then cut into 0.5-inch wide strips and tested on an Instron tensile tester to measure elongation and tensile strength at break. Duplicate cured films are soaked in an excess of 0.5 percent aerosol OT solution for 5 minutes and then tested on an Instron to measure elongation and tensile strength at break. For comparison, a sample of the carboxylic latex containing no pendant oxazoline group is formed into films and tested as described herein. The results are as reported as Sample No. C-1 in Table I following. The results obtained on films prepared from the latex of this invention are reported in Table I following as Sample No. 1.

TABLE I

|  | Sample No. 1 | Comparative Sample No. C-1* |
|---|---|---|
| R.T. Cure [1] |  |  |
| Dry Tensile[2] | 815 | 1085 |
| Wet Tensile[3] | 909 | 383 |
| Dry Elong.[4] | 351 | 413 |
| Wet Elong.[5] | 285 | 435 |
| 100° C. Cure[6] |  |  |
| Dry Tensile | 1385 | 965 |
| Wet Tensile | 1124 | 472 |
| Dry Elong. | 304 | 395 |
| Wet Elong. | 275 | 443 |
| 120° C. Cure[7] |  |  |
| Dry Tensile | 1361 | 851 |
| Wet Tensile | 1300 | 378 |
| Dry Elong. | 268 | 399 |
| Wet Elong. | 283 | 401 |
| 150° C. Cure[8] |  |  |
| Dry Tensile | 1460 | 861 |
| Wet Tensile | 1648 | 562 |
| Dry Elong. | 236 | 403 |
| Wet Elong. | 260 | 504 |

*Not an example of the invention.
[1] Films cured at room temperature for 24 hours.
[2] Tensile strength of films cured at designated temperatures measured in dry films using an Instron tensile tester.
[3] Tensile strength of films cured at the designated temperatures, measured on films soaked for 5 minutes in a 0.5 percent aqueous surfactant solution immediately before testing. Testing performed on an Instron tensile tester.
[4] Percent elongation of films cured at designated temperatures measured on dry films using an Instron tensile tester.
[5] Percent elongation of films cured at the designated temperature, measured on films soaked in an aqueous surfactant solution immediately before testing. Testing performed on an Instron Tensile tester.
[6] Films cured at 100° C. for 5 minutes.
[7] Films cured at 120° C. for 5 minutes.
[8] Films cured at 150° C. for 5 minutes.

As can be seen from Table I above, the latex of this invention forms films having higher tensile strength than the films formed from the control latex. More significantly, the tensile strength of the films of this invention are not significantly impaired upon soaking the films in water. In fact, at high curing temperatures, wetting of the films actually increases their tensile strength. By contrast, the control samples loses significant tensile strength upon soaking in the surfactant solution.

EXAMPLE 2

In this example, a coreactive latex (51 percent solids) containing a styrene/butadiene/fumaric acid terpolymer (57.6/40.5/1.9 weight ratio) is used as a starting material.

A 1584-g portion of this latex is added to a 1-gallon stainless steel reactor. Sufficient of the 28 percent aqueous ammonium hydroxide solution is added to the latex to increase the pH to about 8.5. Then, 198 g of deionized water, 2 g of a 1 percent active sodium diethylene triamine pentaacetate solution, 1 g of sodium persulfate, 20 g of 2-isopropenyl-2-oxazoline, 99 g of styrene and 4 g of carbon tetrachloride are added. The reactor is then purged with nitrogen and 81 g of butadiene are added. The reaction mixture is then heated to 60° C. for 8 hours. The latex is then steam distilled to remove unreacted monomers. The resulting latex contains particles having both pendant coreactive and pendant oxazoline groups, as confirmed by infrared spectroscopy. Films are prepared from the product latex and cured as described in Example 1 hereinbefore. The tensile properties of the resultant films are evaluated as described in Example 1 with the results as reported as Sample No. 2 in Table II following.

For comparison, a portion of the coreactive latex which has not been modified with the oxazoline polymer is formed into films, cured and tested as described in Example 1. The results are as reported in Sample No. C-2 in Table II following.

TABLE II

|  | Sample No. 2 | Comparative Sample No. C-2* |
|---|---|---|
| R.T. Cure[1] |  |  |
| Dry Tensile[2] | 997 | 1052 |
| Wet Tensile[3] | 406 | 103 |
| Dry Elong.[4] | 443 | 552 |
| Wet Elong.[5] | 351 | 207 |
| 100° C. Cure[6] |  |  |
| Dry Tensile | 1072 | 1173 |
| Wet Tensile | 458 | 110 |
| Dry Elong. | 447 | 531 |
| Wet Elong. | 362 | 286 |
| 120° C. Cure[7] |  |  |
| Dry Tensile | 1268 | 1215 |
| Wet Tensile | 624 | 123 |
| Dry Elong. | 455 | 546 |
| Wet Elong. | 387 | 361 |
| 150° C. Cure[8] |  |  |
| Dry Tensile | 1420 | 1500 |
| Wet Tensile | 1195 | 392 |
| Dry Elong. | 435 | 579 |
| Wet Elong. | 405 | 405 |

*Not an example of the invention.
Notes [1] through [8] are the same as in Table I.

Here, it is seen that the dry tensile strength of the carboxylated, IPO modified latex is essentially equivalent to those of the dry carboxylated latex. However, when wet tensile strength is evaluated, the film prepared from latexes of this invention are clearly superior to those of the control.

EXAMPLE 3

In this example, a 48.6 percent solids latex of a 58/38/4 ratio of styrene/butadiene/acrylic acid terpolymer is employed as coreactive starting material.

A 1646-g portion of this latex is added to a 1-gallon stainless steel reactor. Sufficient of a 28 percent aqueous ammonium hydroxide solution is added to the latex to increase the pH to about 8.6. Then, 198 g of deionized water, 1 g of sodium persulfate, 2.0 g of a 1 percent active sodium diethylene tetraamine pentaacetate solution, 20 g of 2-isopropenyl-2-oxazoline, 96 g of styrene and 6 g of carbon tetrachloride are added to the reactor. The reactor is then purged with nitrogen and 84 g of butadiene are added. The resulting mixture is then polymerized at 60° C. for 7 hours. The resultant latex contains particles having both pendant acid and pendant oxazoline groups. Films are formed from the product latex according to the method described in Example 1 and are tested for tensile properties. The results are as reported in Table III. For comparison, films are prepared from the carboxylated latex containing no oxazoline groups. These films are tested for tensile properties with the results as reported in Table III following as Sample No. C-3.

TABLE III

|  | Sample No. 3 | Comparative Sample No. C-3* |
|---|---|---|
| R.T. Cure[1] |  |  |
| Dry Tensile[2] | 1642 | 1709 |
| Wet Tensile[3] | 963 | 1412 |

TABLE III-continued

|  | Sample No. 3 | Comparative Sample No. C-3* |
|---|---|---|
| Dry Elong.[4] | 411 | 370 |
| Wet Elong.[5] | 315 | 276 |
| 100° C. Cure[6] | | |
| Dry Tensile | 1819 | 1849 |
| Wet Tensile | 1510 | 1412 |
| Dry Elong. | 406 | 395 |
| Wet Elong. | 347 | 276 |
| 120° C. Cure[7] | | |
| Dry Tensile | 1989 | 1750 |
| Wet Tensile | 1598 | 1776 |
| Dry Elong. | 403 | 378 |
| Wet Elong. | 348 | 342 |
| 150° C. Cure[8] | | |
| Dry Tensile | 1949 | 1744 |
| Wet Tensile | 2008 | 1805 |
| Dry Elong. | 355 | 377 |
| Wet Elong. | 324 | 331 |

*Not an example of the invention.
Notes [1] through [8] are the same as in Table I.

Again, the excellent tensile properties of wet and dry films of this invention are seen.

EXAMPLE 4

Into a 1-liter, glass reactor immersed in a temperature controlled water bath are added 359 g of deionized water, 3 g of a 1 percent active aqueous pentasodium diethylene triamine pentaacetate solution and 4.5 g of a 32 percent solids seed latex containing polystyrene polymer particles.

The reactor is purged with nitrogen and heated to 83° C. Then, over a 1-hour period is added a first monomer stream containing 90 g of butylacrylate, 53.75 g of methylmethacrylate and 5.0 g of acrylic acid. After this first monomer addition, the reactor is maintained at about 83° C. for 15 minutes. Three grams of 28 percent ammonium hydroxide solution is added to increase the pH from 3.5 to 8.3, and then a second monomer stream is begun. This second monomer stream is added over a 1-hour period and contains 90 g of butylacrylate, 53.75 g methylmethacrylate and 7.5 g of 2-isopropenyl-2-oxazoline. Beginning at the start of the first monomer addition is also added, over a 2¼-hour period, an aqueous stream containing 90 g deionized water, 1.5 g of sodium persulfite, 0.3 g NaOH and 3.3 g of a 45 percent active surfactant solution. Following the addition of the monomer and aqueous streams, the reactor is maintained at 83° C. for 1 additional hour, and then cooled.

This latex is formed into films as described in Example 1. The films are cured by heating at 125° C. for 5 minutes and tested for tensile strength and elongation as described in Example 1. The results are reported as Sample No. 4 in Table IV following.

For comparison, films are prepared in like manner from the following latexes:

| Sample No. C-4A | Butylacrylate/methylmethacrylate (60/40) |
|---|---|
| Sample No. C-4B | Butylacrylate/methylmethacrylate/ acrylic acid (60/38.33/1.67) |
| Sample No. C-4C | Butylacrylate/methylmethacrylate/ 2-isopropenyl-2-oxazoline (60/37.5/2.5) |
| Sample No. C-4D | 50:50 Blend of C-4B and C-4C |

All films are tested for tensile strength and elongation as described hereinbefore with the results as reported in Table IV following.

TABLE IV

|  | Sample No. | | | | |
|---|---|---|---|---|---|
|  | 4 | C-4A* | C-4B* | C-4C* | C-4D* |
| Dry Tensile[1] | 1420 | 710 | 960 | 980 | 1080 |
| Dry Elongation[2] | 560 | 730 | 680 | 780 | 690 |
| Wet Tensile[3] | 940 | 380 | 740 | 860 | 906 |
| Wet Elongation[4] | 430 | 550 | 630 | 600 | 630 |

*Not an example of the invention.
[1]Same as Note[2], Table I.
[2]Same as Note[4], Table I.
[3]Same as Note[3], Table I.
[4]Same as Note[5], Table I.

As can be seen from the data in Table IV, films prepared from the latex of this invention exhibit the highest tensile stength, whether tested wet or dry. Even Sample No. C-4D, which contains only oxazoline-containing particles and acid-containing particles, does not exhibit the tensile strength of films prepared from the latex of this invention.

What is claimed is:

1. A curing latex composition comprising discrete polymer particles, which particles contain pendant coreactive groups selected from the group consisting of weak acid groups, aliphatic alcohols, aromatic alcohols, amines and amides and pendant oxazoline groups, which particles have been prepared by the polymerization of addition polymerizable monomers, which monomers comprise (a) a coreactive monomer containing pendant groups which are capable of reacting with an oxazoline group to form a covalent bond thereto, (b) an oxazoline as represented by the general structure:

$$R^2-\underset{\underset{R^2}{|}}{\overset{\overset{R^2}{|}}{C}}-\left(\underset{\underset{R^2}{|}}{\overset{\overset{R^2}{|}}{C}}-R^2\right)_n$$
$$\underset{\underset{R^1}{|}}{\overset{O}{\diagdown}}\underset{C}{\diagup}^N$$

wherein $R^1$ is an acyclic organic radical having addition polymerizable unsaturation; each $R^2$ is independently hydrogen, halogen or an inertly substituted orgaanic radical and n is 1 or 2 and (c) at least one other addition polymerizable monomer which does not contain a coreactive or oxazoline group.

2. The composition of claim 1 wherein the coreactive monomer is an $\alpha,\beta$-ethylenically unsaturated carboxylic acid or acid anhydride.

3. The composition of claim 1 wherein said other addition polymerizable monomer is a monovinyl aromatic or an ester of an $\alpha,\beta$-ethylenically unsaturated carboxylic acid and/or an aliphatic conjugated diene.

4. The composition of claim 1 wherein $R^1$ is an isopropenyl group, each $R^2$ is hydrogen or an alkyl group and n is 1.

5. The composition of claim 4 wherein the oxazoline is 2-isopropenyl-2-oxazoline.

6. The composition of claim 1 wherein the polymer particles comprise a first polymer of a coreactive monomer and at least one other addition polymerizable monomer which does not contain a coreactive or oxazoline group and a second polymer of an oxazoline and at least one other addition polymerizable monomer which does not contain a coreactive or oxazoline group.

7. The composition of claim 1 which is self-curing at room temperature.

8. A process for preparing a latex comprising discrete particles containing pendant weak acid and oxazoline groups, said process comprising the steps of (a) forming a latex containing particles of a polymer containing pendant weak acid groups by polymerizing a first monomer mix comprising an addition polymerizable monomer containing pendant weak acid groups and at least one other addition polymerizable monomer which is copolymerizable with said monomer, said polymerization being conducted at a pH in the range from about 1 to about 6, then (b) adjusting the pH of the resulting latex to a value at which an addition polymerizable oxazoline does not substantially react or hydrolyze under conditions suitable for the polymerization thereof, (c) adding to said latex a second monomer mix comprising (1) an addition polymerizable oxazoline as represented by the general formula:

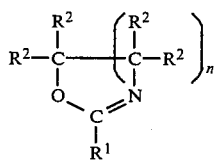

wherein $R^1$ is an acyclic organic radical hving addition polymerizable unsaturation; each $R^2$ is independently hydrogen, halogen or an organic radical and n is 1 or 2 and (2) at least one other monomer and (d) polymerizing said monomer mix under conditions such that the second monomer mix is polymerized within or around said polymer particles containing pendant weak acid groups.

9. The process of claim 8 wherein said first monomer mix comprises an $\alpha,\beta$-ethylenically unsaturated carboxylic acid and a monovinyl aromatic or an alkyl ester of an $\alpha,\beta$-ethylenically unsaturated carboxylic acid or an aliphatic conjugated diene and said second monomer mix comprises an addition polymerizable oxazoline and a monovinyl aromatic, an alkyl ester of an $\alpha,\beta$-ethylenically unsaturated carboxylic acid or an aliphatic conjugated diene.

10. The process of claim 8 wherein the oxazoline is 2-isopropenyl-2-oxazoline.

11. The process of claim 8 wherein the pH is adjusted from about 7 to about 11.

12. The process of claim 8 wherein the second monomer mix contains from about 0.5 to about 2 moles of oxazoline per mole of coreactive monomer employed in said first monomer mix.

13. The process of claim 9 wherein the coreactive monomer is acrylic, methacrylic, itaconic or fumaric acid, and the oxazoline is 2-isopropenyl-2-oxazoline.

* * * * *